R. WHITE.
CLAMP NUT FOR SCREWS.

No. 105,614.

Patented July 19, 1870.

United States Patent Office.

ROBERT WHITE, OF ROCKVILLE CENTRE, NEW YORK, ASSIGNOR TO HIMSELF AND JOSEPH J. WALTON, OF NEWARK, NEW JERSEY.

Letters Patent No. 105,614, dated July 19, 1870.

IMPROVEMENT IN CLAMP-NUT FOR SCREWS.

The Schedule referred to in these Letters Patent and making part of the same

*To all whom it may concern:*

Be it known that I, ROBERT WHITE, of Rockville Centre, in the county of Queens and State of New York, have invented and made a new and useful Clamp-Nut for Screws; and the following is declared to be a correct description of the said invention.

Heretofore a lock or jam-nut has been employed to prevent the turning of the nut upon a screw-bolt. In the use of jam-nuts there is a risk of injuring the thread, because the nut next the washer or article is screwed up, and then the jam-nut, acting against the first nut, tends to force the first nut more tightly to place, throwing the principal strain upon the lock-nut, at the risk of stripping the thread.

My invention is made for the purpose of preventing injury to the screw-thread, by increasing the length of the bearing, and causing the threads of the nut to more intimately clasp and bind the thread upon the bolt, so as to prevent the nut working loose. Thereby there is not any jamming of the thread in opposite directions, and the thread is preserved and the nut strengthened.

In the drawing—

Figure 1:
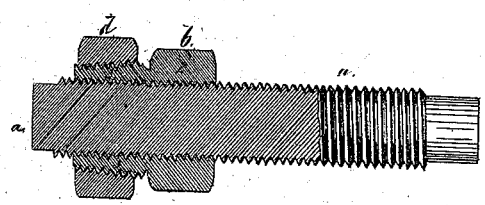
Figure 1 shows a longitudinal section of the bolt, nut, and clamp.
Figure 2:
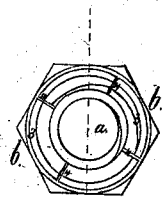
Figure 2 is an end view of the clamp-nut.

The bolt $a$ is of any usual size or character, with a screw-thread cut upon the same.

The nut $b$ is made with the polygonal portion 2 and conical screw-clamping portion 3. This part 3 is divided longitudinally by saw-cuts or incisions 4, and the thread inside the nut corresponds with that on the bolt.

The thread around the external conical portion 3 corresponds with that in the interior of the clamp-nut $d$.

It will now be understood that, by screwing the conical nut $d$ upon the conical portion 3, the bolt $a$ will be clamped, and sufficient friction produced to prevent the nut $b$ working loose, and the screw-threads will be pressed intimately together, to take a firm, even, and extended bearing, greatly strengthening the nut, and preventing injury to the thread.

I claim as my invention—

The conical screw-clamping portion 3 of the nut $b$, divided by longitudinal incisions, in combination with the conical clamping-nut $d$, substantially as specified.

Signed by me this 18th day of June, A. D. 1870.

ROBT. WHITE.

Witnesses:
CHAS. H. SMITH,
GEO. T. PINCKNEY.